United States Patent [19]

Owerko

[11] Patent Number: 4,464,792
[45] Date of Patent: Aug. 7, 1984

[54] PORTABLE TRANSMITTER ENCLOSURE

[75] Inventor: John R. Owerko, Raton, N. Mex.

[73] Assignee: A.R.F. Products, Inc., Raton, N. Mex.

[21] Appl. No.: 538,912

[22] Filed: Oct. 4, 1983

Related U.S. Application Data

[63] Continuation of Ser. No. 302,955, Sep. 16, 1981, abandoned.

[51] Int. Cl.³ ............................................. H04B 1/03
[52] U.S. Cl. .................................. 455/128; 340/539; 361/399; 361/422; 312/7.1
[58] Field of Search ................... 455/90, 128, 95, 347, 455/349; 340/539, 547, 825.69, 870.28; 361/422, 399; 312/7.1

[56] References Cited

U.S. PATENT DOCUMENTS

| 2,791,621 | 5/1957 | Hewitt et al. | 455/128 |
| 3,087,117 | 4/1963 | Mitchell | 455/128 |
| 3,289,085 | 11/1966 | Leland | 455/128 |
| 4,019,141 | 4/1977 | Numan et al. | 455/349 |
| 4,121,160 | 10/1978 | Cataldo | 455/128 |
| 4,335,375 | 6/1982 | Schaeffer | 340/547 |

Primary Examiner—Jin F. Ng
Attorney, Agent, or Firm—Burmeister, York, Palmatier, Hamby & Jones

[57] ABSTRACT

A portable transmitter provided with a base for mounting a subassembly with a circuit board and a battery adjacent to each other and within a removable cover. The subassembly having adjustable frequency determining elements and the base having a flap integral therewith extending over and covering the frequency determining elements.

6 Claims, 5 Drawing Figures

PORTABLE TRANSMITTER ENCLOSURE

This application is a continuation of application Ser. No. 06/302,955, filed Sept. 16, 1981, now abandoned.

The present invention relates to portable radio frequency transmitters suitable for use in security systems, and particularly to enclosures for such portable transmitters.

In the past, security systems have generally used a central control unit which is capable of actuating an alarm or reporting an intrusion or a fire and which is electrically connected by wiring to a plurality of switch terminals. The switch terminals are generally mounted on adjacent movable portions of doors and windows to effect opening or closing of a circuit in response to movement of a door or a window, thus actuating the control unit and ultimately the alarm system.

More recently, security systems have been improved by utilizing remotely located battery powered radio frequency transmitters to provide the link between the remote switches and the control unit. Such portable battery powered transmitters may be located adjacent to each of the electrical switches of the security system, eliminating the need for wiring and reducing the cost, inconvenience, and unsightliness often caused by the installation of a security system in a residence, office, or factory. The actuation of a given remote switch results in the generation of a radio frequency signal from the associated portable transmitter, and the radio frequency signal is received at the control unit, and the received signal is used to actuate the alarm.

One of the advantages of utilizing portable radio frequency transmitters in a security system is the fact that the transmitter can be totally self contained, including the battery. It is however periodically necessary to replace the battery, and hence the battery must be conveniently located within the enclosure for the transmitter. Prior to the present invention, it was conventional to mount the transmitter on a plate shaped base which also carried the battery. A cover was also mounted on the base and could be pivoted from the base or removed from the base in a convenient fashion to expose the battery for replacement, or to perform other service on the transmitter. One of the difficulties which arose from such a construction was the fact that the replacement of the battery exposed the frequency determining circuits of the transmitter, and replacement of the battery posed the risk of changing the frequency of the transmitter. A change in the frequency of the transmitter from the responsive frequency of the control unit will result in failure of the system.

It is an object of the present invention to provide an improved enclosure for the portable radio frequency transmitter for use in a security system. More particularly, it is an object of the present invention to provide an enclosure for a portable transmitter which consists of a base and a cover in which the frequency determining circuits of the transmitter are protected even when the cover is pivoted away from the base or removed from the base.

It is also an object of the present invention to provide such an improved enclosure for a portable transmitter without materially adding to the cost of the enclosure, and in particular, it is an object of the present invention to provide an enclosure with a base and a cover constructed of plastic and provided with a protective flap extending over the frequency determining circuits.

These and further objects of the present invention will be apparent from the following specification, particularly when viewed in the light of the drawing, in which.

Figure 2:
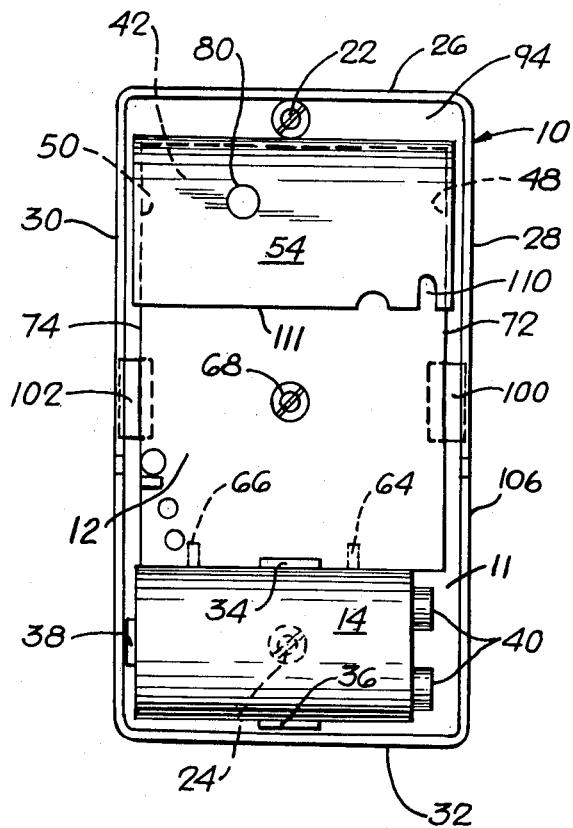
FIG. 2 is a plane view of the transmitter of FIG. 1 with the cover of the enclosure removed.
Figure 1:
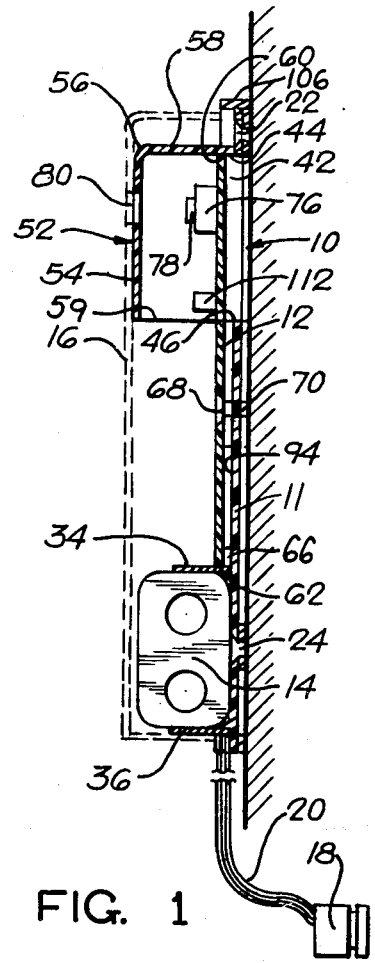
FIG. 1 is a sectional view of a portable transmitter constructed according to the present invention, the plane of the figure being shown in FIG. 2.

FIG. 1 illustrates the complete portable transmitter which consists of a base 10, a circuit board 12, a battery 14, and a cover 16. A two part switch 18 is also connected to the circuit board 12 by means of a wire 20. Generally, the switch 18 is a magnetic type switch in which one part of the switch is mounted on a fixed part of the structure and the other part is mounted on a movable part of the structure to detect movement between the two parts of the structure. The wire 20 is generally made short by locating the portable tansmitter on a wall of a structure adjacent to the switch 18.

The base 10 is generally rectangular in shape and is in the form of a flat plate 11 provided with two apertures 22 and 24 for mounting the base on a wall. The apertures are disigned for screw mounting, and have a chamfered opening on the inner side of the enclosure to permit the use of a flat headed screw without taking up space within the transmitter enclosure. The aperture 22 is located adjacent to one end 26 of the enclosure and centrally between the opposite sides 28 and 30 of the enclosure. The other aperture 24 is located near the opposite end 32 of the enclosure centrally of the mounting for the battery 14. The base is provided with a pair of spaced posts 34 and 36 which extend from the plate 11 in the plane of the apertures 22 and 24, and the posts 34 and 36 and portion of the plate 11 there between form retainers for the battery 14. In addition, a third post 38 extends from the inner side of the plate 11 of the base 10 adjacent to the side 30 to form a side support for the battery 14, thereby positioning the battery between the posts 34, 36, and 38 with the terminals 40 of the battery extending toward the side 28 of the base 10.

The plate 11 of the base 10 is provided with a recatangular opening 42 adjacent to the end 26. The opening 42 forms on the plate a pair of parallel surfaces 44 and 46 which are parallel to the end 26 of the base 10. A pair of parallel walls 48 and 50 extend from the plate 11 adjacent to the opening 42, the walls 48 and 50 being normal to the surfaces 44 and 46 and disposed adjacent to the sides 28 and 30, respectively. A flap 52 extends from the plate 11 of the base 10 adjacent to the surface 44 of the opening 42 and has a wall portion 54 substantially parallel to and spaced from the base 10. The wall portion 54 of the flap lies in a flat plane and is connected through a bend 56 to a second wall portion 58 which extends normally from the plate 11 of the base 10 at the edge of the surface 44 of the opening 42. The flap 52 and walls 48 and 50 are joined at the edges of the flap to form an integral structure with the plate 11, and providing an opening 59 confronting the battery 14.

The flap 52 forms a protective shield for a portion of the circuit board 12 which extends adjacent to the plate 11 of the base 10 under the wall portion 54 of the flap 52. The circuit board 12 is rectangular in shape and has one edge 60 disposed adjacent to the second wall portion 58 of the flap 52 and an opposite edge 62 disposed adjacent to and abutting the side of the post 34 opposite the battery 14. The base 10 also has a pair of spaced posts or ribs 64 and 66 projecting from the plate 11 on opposite sides of the post 34, and the circuit board 12 rests against and on top of these projecting posts 64 and 66. The circuit board 12 is secured in place by a screw 68 located centrally of the circuit board and engaging an aperture 70 in the base 10. The circuit board 12 has a second pair of edges 72 and 74 which are parallel to each other and perpendicular to the edges 60 and 62. The edges 72 and 74 are disposed parallel to the sides 28 and 30 of the base 10 and spaced inwardly therefrom and from the walls 48 and 50.

Electrically, the transmiiter is of conventional design, and all of the elements of the transmitter are mounted on the circuit board excepting the battery 14, the switch 18 and interconnecting wires 20. The transmitter contains a frequency determining element 76 which may be a variable condenser or reactor, and that frequency determining element is provided with a rotatable screw type adjuster 78. The rotatable adjuster 78 confronts an orifice 80 in the wall portion 54 of the flap 52, thereby permitting adjustment of the frequency by means of a screwdriver or other tuning instrument while maintaining the frequency determining element 76 shrouded beneath the flap 52.

Figure 5:
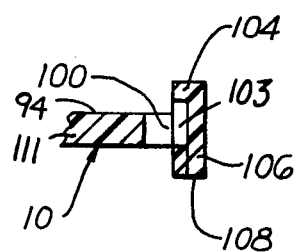
FIG. 5 is a fragmentary view thereof.
Figure 3:
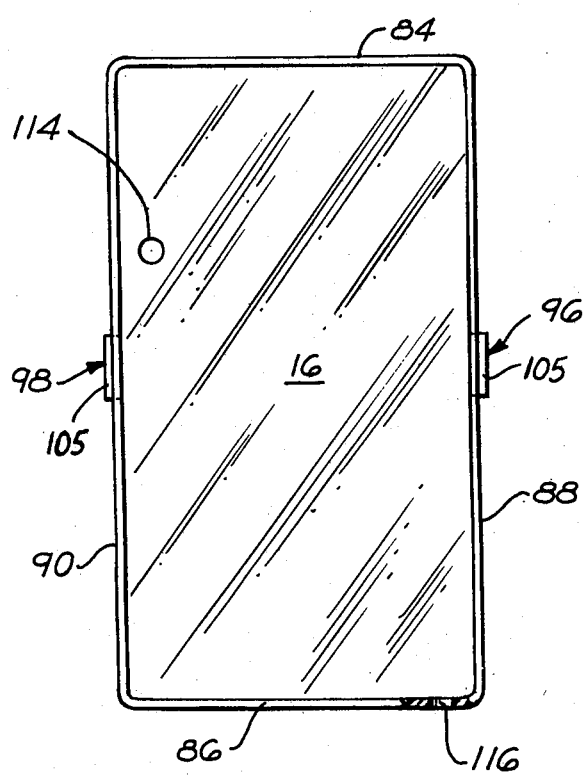
FIG. 3 is a rear view of the cover of the enclosure of the transmitter of FIGS. 1 and 2.
Figure 4:
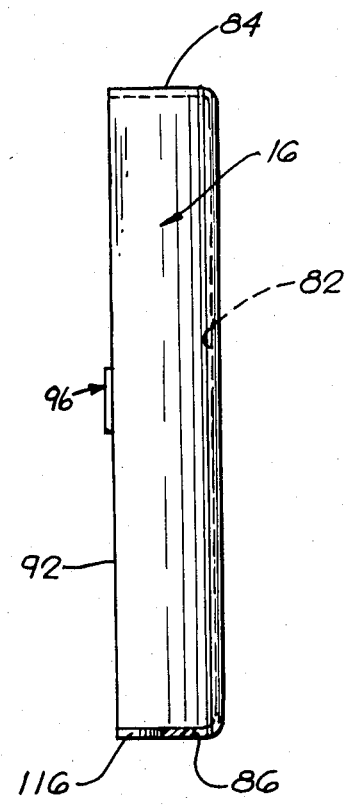
FIG. 4 is a side elevational view of the cover of FIG. 3.

The cover 16 is illustrated in detail in FIGS. 3 and 4. It has a flat retangular front wall 82 which is integral with two pairs of side walls 84, 86, and 88, 90. The four side walls 84, 86, 88 and 90 terminate in edges 92 disposed on a plane parallel to and spaced from the front wall 82. When the cover 16 is mounted on the base 10, the edges 92 abut the forward surface of the plate 11 of the base 10, that surface being designated 94. The cover 16 is provided with two ribs 96 and 98 which extend outwardly from the edges 92 of the walls 88 and 90, respectively, in a direction opposite the front wall 82. The ribs 96 and 98 are adapted to be accommodated in two rectangular openings 100 and 102 located in the plate 11 of the base 10. The opening 100 is disposed adjacent and parallel to the side 28 of the base 10 and the opening 102 is disposed adjacent to and parallel to the side 30 of the base 10. As illustrated in FIG. 5, the base 10 is provided with a rail 106 which extends about all four edges 60, 62, 72 and 74 of the plate 11 of the base 10 to form the perimeter of the base 10. The openings 100 and 102 extend to and are aligned with recesses 103 in the lip 104 and form lips 104 upwardly and inwardly of the plate 11. The lips 104 engage outwardly protruding nubs 105 of the ribs 96 and 98 to retain the cover 16 in position on the base. Further, as illustrated in FIG. 5, the rail 106 provides a space between the surface upon which the enclosure is mounted and the plate 11. The rail 106 terminates in an edge 108 disposed in a flat plane.

The flap 52 is effective to protect the frequency determining element 56 from accidental adjustment during periods of servicing, such as battery replacement. Nonetheless, the flap 52 does not prevent or hinder frequency adjustment. The base 10 and cover 16 are preferably constructed of plastic material, such as styrene, and both the base 10 and the cover may be injection molded, thus producing relatively low cost members. It is to be noted that the plastic utilized for the flap 52 is substantially equal in volume to the plastic removed from the base by providing the aperture 42. In addition, the provision of the aperture 42 makes it possible to injection mold the base 10 inclusing the flap 52 in a single operation in a simple and conventional injection mold.

It will be noted that the flap 52 is provided with a recess 110 in the forward edge 111 of the wall portion 54 adjacent to the side 28 of the base. An illuminator 112, such as a light emitting diode, is mounted on the circuit board 12 confronting the recess 110, and the illuminator is electrically connected into the transmitter circuit to be illuminated when the transmitter is in the "on" condition. Hence, whenever the transmitter is actuated by the switch 18, the illuminator 112 emits light. The cover 16 is provided with an aperture 114 confronting the illuminator in order to permit the presence of light from the illuminator to be detected from the exterior of the transmitter.

The cover 16 is also provided with an inwardly extending recess 116 in the side wall 86 thereof, and the wires 20 which extend between the circuit board 12 and the switch 18 pass through the recess 116 when the cover 16 is in place on the base 10. The use of a recess in the wall 86 of the cover 16 facilitates installation of the transmitter, since the base may first be permanently affix to a structure prior to connecting the switch 18 to the circuit board 12.

Those skilled in the art will recognize advantages and applications for the present invention in addition to those disclosed herein. It is therefore intended that the scope of the present invention be not limited by the foregoing specification, but rather only by the appended claims.

The invention claimed is:

1. A transmitter adapted for use at a remote location in a security system comprising an integral molded base having a flat plate with a first side and a second side opposite the first side, the plate being adapted to be mounted on a flat surface with the first side of the plate confronting the surface, said base being provided with a flap extending from the plate on the second side of the plate and having a portion extending parallel to the plate, the edge of the flap opposite the plate being spaced from the plate to form an opening, the plate having an opening confronting the flap, said opening being coextensive with the portion of the flap confronting the base, a subassembly including a flat circuit board having electrical components mounted thereon including frequency determining elements, means for mounting the circuit board on said plate confronting the second side of the plate and the opening in the plate, said circuit board extending through the opening formed by said flap between the flap and the plate and the frequency determining elements of subassembly being disposed between the opening in the plate and the flap, and a cup shaped cover removably mounted on the base and extending from the second side of the plate, said cover enclosing the flap and the circuit board.

2. A transmitter comprising the combination of claim 1 wherein the plate is provided with protruding posts on the second side of the plate spaced from the opening in the plate and an aperture, said posts abutting the circuit board, and the means for mounting the circuit board on the plate comprising a fastener mounted on the circuit board and engaging the aperture in the plate.

3. A transmitter comprising the combination of claim 1 wherein the plate is provided with two spaced posts extending from the second side thereof, one of said posts being disposed on the side of the circuit board remote from the opening and the other of said posts being disposed adjacent to the end of the plate opposite the flap, in combination with a battery disposed between the plate and the cover between and in abutment with the posts.

4. A transmitter comprising the combination of claim 1 wherein the base is rectangular and provided with a rail extending about the perimeter of the plate and protruding from the first side of the plate, said rail being adapted to provide a space between the plate and the surface to which the transmitter is mounted.

5. A transmitter comprising the combination of claim 4 wherein the cup shaped cover is rectangular in shape and has side walls abutting the base adjacent to the perimeter of the plate, said base having a plurality of elongated openings in the base parallel to and adjacent to the rail thereof, the rail having an inwardly extending lip partially overlying the elongated openings and the cover having a protuding rib removably disposed in each of said openings, said rib extending outwardly of the cover to engage the lip of the rail.

6. A transmitter comprising the combination of claim 1 wherein the frequency determining element is provided with movable adjustment means confronting the section of the flap which is parallel to the plate, and the parallel section of the flap is provided with an aperture confronting the movable adjustment means.

* * * * *